May 19, 1970 R. S. JOHN, JR 3,513,268

OPTICAL RECORDING AND REPRODUCING SYSTEMS INCLUDING NOISE REDUCING MEANS

Filed Aug. 30, 1966 2 Sheets-Sheet 1

INVENTOR.
Robert S. John, Jr

BY

Griffin & Branigan

ATTORNEYS

INVENTOR.
Robert S. John, Jr.
BY
Griffin & Branigan
ATTORNEYS

United States Patent Office 3,513,268

Patented May 19, 1970

3,513,268

OPTICAL RECORDING AND REPRODUCING SYSTEMS INCLUDING NOISE REDUCING MEANS

Robert S. John, Jr., Deerfield, Ill., assignor to Bell & Howell Company, Chicago, Ill., a corporation of Illinois Filed Aug. 30, 1966, Ser. No. 576,145
Int. Cl. G11b 7/16
U.S. Cl. 179—100.3 4 Claims

ABSTRACT OF THE DISCLOSURE

This disclosure describes a method and apparatus for reducing noise in an optical recording and reproducing system. The optical recording medium is a film strip having photosensitive interior and exterior layers. The information to be recorded is recorded on the interior layer only and not on the exterior layer. To reproduce the information, the interior and exterior layers are scanned and the exterior layer is scanned alone. The results of the two scannings are subtractively combined so that the information recorded on the interior layer is reproduced.

This invention relates to optical recording and more particularly to a method and apparatus for reducing noise in an optical recording and reproducing system.

For ease of illustration the invention is hereinafter described as embodied in a color motion picture sound recording and reproducing apparatus. However, it will be obvious to those skilled in the art that the invention is equally suitable for reducing noise in other types of optical recording systems.

Optical recording is the modulation of a light beam impinging on a photosensitive surface (film). The beam is modulated in accordance with the signal to be recorded. The modulation may take the form of varying the intensity of the light beam; or, the modulation may take the form of varying the width of a slit located between the light beam and the film. Variation of the intensity of the beam is known in the art as variable density modulation and recording and variation of the width of the beam is known as variable width modulation and recording. Numerous systems for performing either of these methods are well known in the art.

After the film is devloped the optical recording is reproduced by passing the film between a light beam of fixed intensity and a photodetector. As the film moves it modulates the amount of light impinging on the photosensitive surface of the photodetector. This light modulation modulates the voltage across the output terminals of the photodetector. That is, varying the intensity of the light impinging on the photosensitive surface of the photodetector may vary its resistance (for one type of detector) or may vary its ability to generate electrical energy (for another type of detector). These variations result in a modulated electrical signal which represents the original recorded information. In a motion picture film system this electrical signal is amplified and applied to a speaker.

While this simple method and apparatus for recording has found widesperad use it has certain disadvantages.

A variable density film record appears to be a series of parallel lines. In reality, the density or light passing ability of the film is varied in accordance with the intensity of the impinging light that created the record. It is this variation in intensity which determines the amount of light that impinges on the photosensitive surface of the detector in the reproducing system. A variable width record appears to be a wavy line. In reality the line separates an opaque area from a non-opaque area. The width of the non-opaque area with respect to the predetermined width of a light path represents the modulated signal. This variable width is used to modulate the light in a reproducing system. It will be appreciated that anything that varies the amount of light passing through the film in a reproducing system will vary the output signal from the photodetector and destroy its value. For example, if the film is scratched a variation in the amount of light passed by the film will occur. This scratch will create noise in the system. If the system is a sound system the scratch will create noise in the audio output. Similarly, a piece of dust on the surface of the film will produce noise. In general, any adhering material or other surface changing condition will create noise. It is noise of this type with which the invention is primarily concerned.

More specifically, the invention as hereinafter described is primarily concerned with the reduction of noise created by the foregoing aberrations to the outer photosensitive layer of a multilayer film. A multilayer film being one having a base formed of a relatively hard material not easily subject to such aberrations and having formed on said base a plurality of layers of a photosensitive material. However, as the following description becomes understood it will be appreciated that while the invention works best for such a film it has applicability of a more general nature. For example, even if the film's base is soft and subject to the foregoing aberrations the invention will still improve the noise reduction of a system using the soft base type of film. Further, if the film does not have a base but has two outer photosensitive layers plus an inner photosensitive layer the invention can be used to reduce noise caused by aberrations on both of the outer photosensitive layers.

Therefore, it is an object of this invention to provide a novel apparatus for reducing the detrimental effects of noise in an optical recording system.

It is a further object of the invention to provide a novel method for reducing the detrimental effects of scratches, dust, or other surface aberrations in an optical recording system.

It is still another object of this invention to provide a novel apparatus for reduing the detrimental effects of noise in an optical recording system.

It is a still further object of this invention to provide a novel apparatus for reducing the detrimental effects of noise created by scratches, dust, or other surface aberrations in an optical recording system.

In accordance with a method of the invention the information to be recorded is optically recorded on an interior layer or layers of a multilayer film. The information is reproduced by scanning the film to detect both the noise and the information signal. The film is simultaneously scanned to detect only the noise. These two scans are subtractively combined to reproduce the original signal. The signal can be recorded either by a variable density or on a variable width method of recording.

In accordance with a principle of the invention, apparatus for carrying out the foregoing method is provided. Specifically, recording means including filtering means is provided for preventing impinging light from creating a record on the outer layer of the film. However, light that will create a record on the interior layers of the film is not filtered. In this manner the sound is recorded on the interior layers but not on the exterior layer. When the film is reproduced appropriate light sources are used in one scanning means to obtain the information contained on all of the layers. A second scanning means uses appropriate light sources or filters to obtain only the information contained in the exterior layer. This exterior layer information represents noise. Means are also provided to subtractively combine these two signals. The combination results in a noise free signal.

It will be appreciated that the foregoing method results in a simple approach to eliminating noise from an optical recording system. Similarly, a simple apparatus is provided to carry out the method of the invention.

The foregoing objects and many attendant advantages of this invention will become more readily apparent upon consideration of the following detailed description when taken in conjunction with the accompanying drawings wherein.

Figure 1:
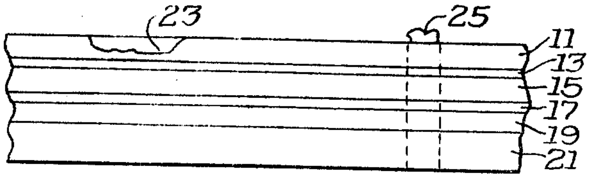
FIG. 1 illustrates a cross sectional diagram of one type of film suitable for use with the invention.

Turning now to the drawings wherein like reference numbers indicate like parts throughout the several views; FIG. 1 illustrates, in cross section, the layers of a dye-only type of film. One type of dye-only film is presently sold under the trade name "Kodachrome." The layers illustrated in the FIG. 1 diagram comprise an exterior or blue layer 11, a first filter 13, a green layer 15, a second filter 17, a red layer 19, and a base 21. In a conventional manner when a light is focused on the film it will create images in the blue, green, and red layers in accordance with the frequency spectrum of the impinging light. In this manner, three superimposed layers of images are created. When the film is developed a bleaching process is used to eliminate the effects of the filter layers 13 and 17. A combination of the color images provides a picture when the film is used for photography.

In addition to recording images, this type of film can also be used to record sound or other types of information. Specifically, to record information a light beam is directed toward the film through a slit. This beam is modulated in accordance with the information to be recorded. The modulation is preferably created by either varying the intensity of the light to provide a variable density record or by varying the width of the slit to provide a variable width record. The result is an optical record of the information. This information, after the film is developed, can be reproduced by shining a light through the film and detecting how the light is modulated by the film.

FIG. 1 also illustrates the types of detrimental noise creating elements which are the subject of the invention. Specifically, a scratch in the blue layer is illustrated at 23 and a piece of dust or other adhering element on the blue layer is illustrated at 25. It will be appreciated that the scratch 23 and the dust 25 will vary the amount of light that will be passed through the film. Hence, if the film record is recorded sound these elements will change the amount of light being passed through the film when the sound on it is being reproduced. This change will create noise in the reproduced sound.

It will be appreciated by those skilled in the art that the detrimental elements are more likely to be created on the blue layer 11 than on the base 21 because, normally, the blue layer is outermost. This location makes the blue layer more susceptible to scratches because it is more easily scratched. Further, this location makes the blue layer more susceptible to the collection of dust or other materials because these materials collect on the surface.

In accordance with a preferred method of the invention the noise created by these types of defects is eliminated by recording the sound only on the red and green or the interior layers of the film and not on the blue or exterior layer 11.

Further, in accordance with a preferred method of the invention, the recorded sound is reproduced by performing two simultaneous readouts on the film. One readout is for all the information on the film, i.e., sound information and noise information. The second readout is for noise information only. These readouts can be performed in any sequence; that is, the noise only readout can be performed first then the noise plus sound readout or the noise plus sound readout can be performed first then the noise only readout. The outputs from the readouts are subtractively combined in time synchronization to obtain a noise free signal. Specifically, the noise signal is subtracted from the sound plus noise to obtain a noise free signal.

Figure 2:
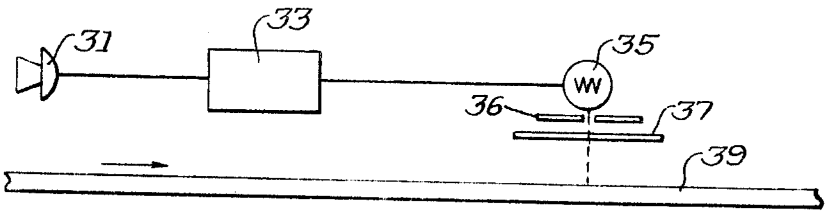
FIG. 2 shows one apparatus made in accordance with the invention for recording information in a variable density manner on a film of the type illustrated in FIG. 1.

FIG. 2 illustrates one simple apparatus for carrying out the method of the invention by recording on the film's red and green layers and not on the film's blue layer. FIG. 2 includes a microphone 31, an amplifier 33, a lamp 35, a slit plate 36, a blue stop filter 37 and a film 39. The output from the microphone 31 is connected to the input of the amplifier 33. The output from the amplifier 33 is connected to the lamp 35. The blue stop filter 37 is mounted between the lamp 35 and the film 39. And the slit plate 36 is illustrated as mounted between the lamp and the filter 37; however, it could be mounted between the filter 37 and the film 39. The slit of the slit plate is preferably at right angles to the direction of film movement. The blue filter, used by way of example, can of course be replaced by a red or a green filter with equivalent results, since the method only requires a single non-modulated layer to be used for noise detection.

The film 39 is of the type illustrated in FIG. 1. The blue stop filter 37 is adapted to eliminate light of a wave length which would be recorded on the blue layer of the film. Hence, the light rays originating at the light 35 are only passed if they are outside of the blue light range. Hence, these rays will only effect the red and green layers and not the blue layer. Specifically, when sound is detected by the microphone 31 it is amplified by the amplifier 33. The amplified signal modulaters the intensity of the output from the lamp 35. This modulation is not recorded on the blue layer but is recorded on the red and green layers because the blue stop filter 37 eliminates light from the blue spectrum. The slit merely provides a means for directing the light onto the desired sound path or track. It will be appreciated by those skilled in the art that modulating the light intensity results in a variable density record.

Figure 3:
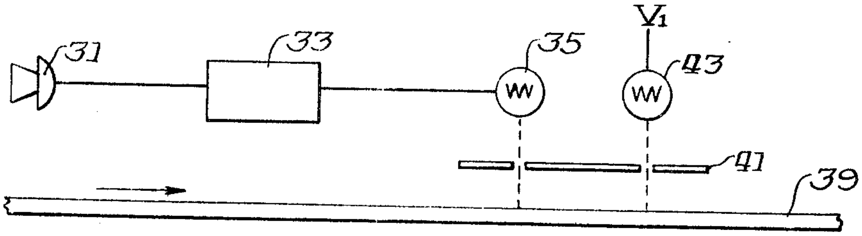
FIG. 3 shows a second apparatus for recording information in a variable density manner on a film of the type illustrated in FIG. 1.

FIG. 3 illustrates a second apparatus for variable density recording on the inner layers of the film but on the exterior blue layer. Specifically, the apparatus illustrated in FIG. 3 comprises a microphone 31, an amplifier 33, a lamp 35, a dual slit plate 41, and a blue lamp 43. The microphone 31, the amplifier 33, and the lamp 35 are connected together as illustrated in FIG. 2. The blue lamp 43 is connected to a voltage source $V_1$. And the dual slit plate 41 is mounted between the lamps 35 and 43 and the film 39 so that light from each lamp passes through a slit. The slits are preferably at right angles to the direction of film movement. The film 39 is adapted to first move past the lamp 35. The intensity of this lamp is modulated by the sound detected by the microphone 31 and the light from the lamp creates a record of the sound signal on all three layers of the film. The film now moves past the blue lamp 43. This lamp only creates light in the blue spectrum. The light from the blue lamp 43 is preferably much higher in intensity than that from the lamp 35. Hence, the light from the blue lamp exposes the blue layer to a high level of illumination and eliminates sound from that layer. In this manner, the modulated signal on the blue layer is overexposed and eliminated. The blue lamp 43 could be a conventional lamp with a blue passing filter located between it and the film 39. Or, it could be a lamp that only generates light in the blue spectrum. All that is necessary is that the blue lamp 43 have enough intensity to eliminate signals recorded on the blue layer of the film. Hence, the resultant variable density film record only has signals on the interior layers. The slits merely provide a means for limiting the light to a desired path and a desired area.

Figure 4:
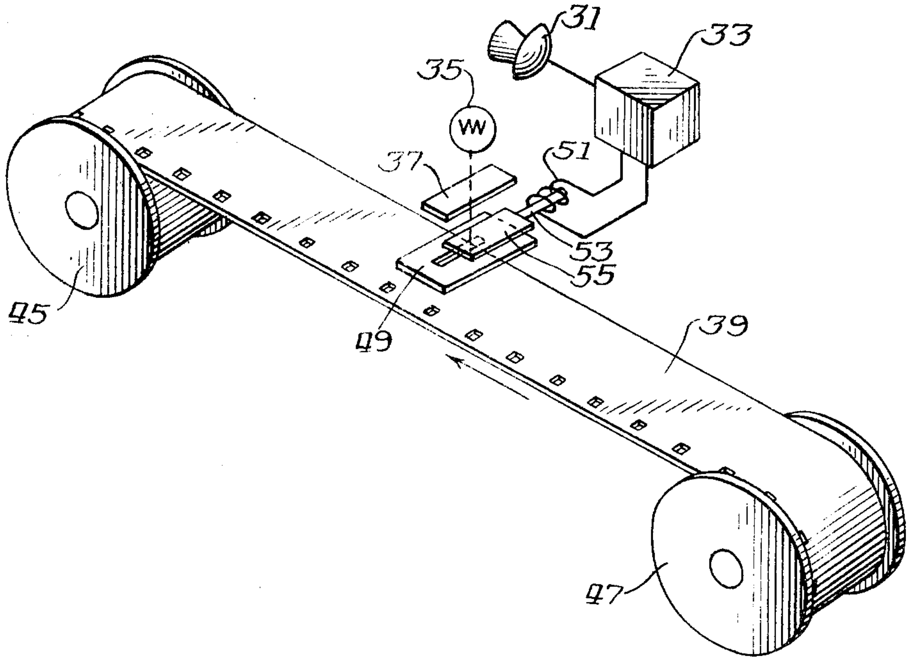
FIG. 4 illustrates one apparatus made in accordance with the invention for recording information in a variable width manner on a film of the type illustrated in FIG. 1.

FIG. 4 illustrates an apparatus for variable width recording on the interior green and red layers but not on the exterior blue layer of a film of the type illustrated in FIG. 1. The apparatus illustrated in FIG. 4 comprises a microphone 31, an amplifier 33, a lamp 35, a blue stop filter 37, a film 39, a takeup reel 45, a supply reel 47, a slit plate 49, a solenoid coil 51, a solenoid rod 53, and a plate 55. The film 47 moves from the supply reel 47 to the takeup reel 45. As in FIG. 2 the output from the microphone 31 is connected to the input of the amplifier 33; and the light from the lamp 35 is adapted to pass through the blue stop filter 37 and the slit of the slit plate 49. However, the lamp 35 is connected to a fixed source of voltage $V_2$ instead of the output of the amplifier 33.

The output from the amplifier 33 is connected to the solenoid coil 51; and the solenoid rod 53 is connected to the plate 55. The plate 55 is mounted over part of the slit of the slit plate 49 and adapted to move along the longitudinal axis of the slit to vary the width of the slit.

In operation the detected sound will modulate the output of the amplifier 33. The amplifier's modulated output modulates the current through the solenoid coil 51. This modulated current modulates the movement of the solenoid rod 53 and its attached plate 55. Modulation of the plate 55 modulates the width of the slit thereby modulating the amount of light impinging on the film 39. In this manner a simple apparatus for variable width recording is provided. The blue filter allows the desired sound signal to be recorded on the film's red and green layers but not on the film's blue layer.

Figure 5:
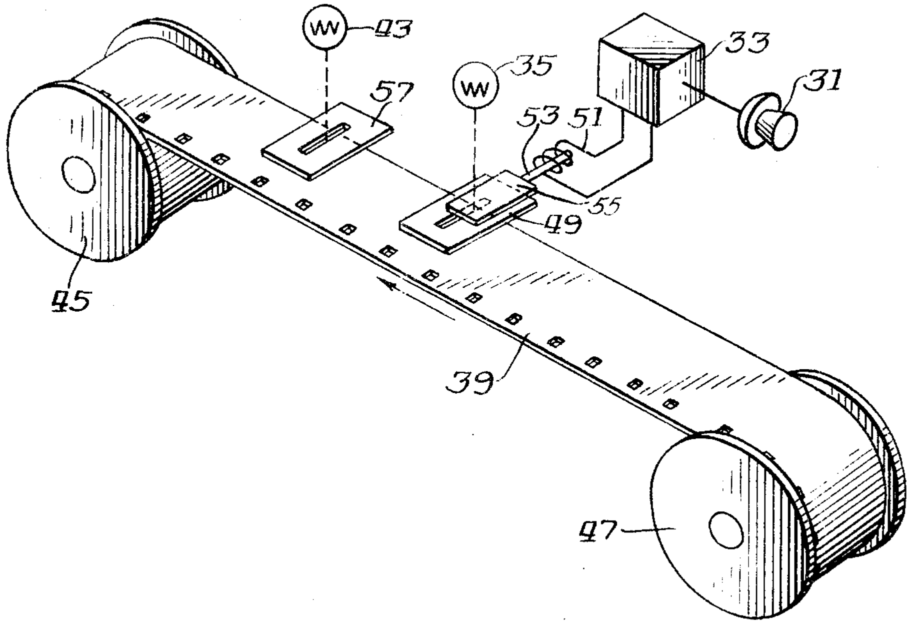
FIG. 5 illustrates a second apparatus for recording information in a variable width manner on a film of the type illustrated in FIG. 1.

FIG. 5 illustrates a second apparatus for variable width recording. The difference between FIGS. 4 and 5 is that the blue stop filter 37 of FIG. 4 has been eliminated in FIG. 5. Further, a blue lamp 43 and a slit 57 of the type illustrated in FIG. 3 have been added. The system operates similar to FIG. 4 for recording the sound signal; however, because the blue filter has been eliminated the sound is recorded on all film layers. Thereafter, the blue layer is over exposed by the blue lamp 43 and its slit 57 in the manner described in connection with FIG. 3. Hence, the resulting record only exists on the inner red and green layers.

In the foregoing manner a simple device is provided for recording information on the interior layers of a motion picture film. It will be appreciated by those skilled in the art that the sound track is normally a narrow path adjacent to the film images. It will further be appreciated by those skilled in the art that if just a sound record is desired, only an interior green or a red layer (not both) would be necessary and that the full width of the film could be used. Hence, while the preferred embodiment is described in conjunction with a conventional color motion picture film it is to be understood that the invention is broader and applies to just information recording and that for information recording the type of film illustrated in FIG. 1 is not necessary. Specifically, all that would be required is to have a layer of one type and a layer of a second type over a base. By using the type of recording devices illustrated in FIGS. 2–5 with appropriate light sources or filters a record would be made on the inner layer but not on the outer layer. However, the total information would still be recorded.

Further, it is to be understood that the record medium does not have to be a motion picture film. It could be a layer type of photosensitive material formed in the shape of a disc. In general, any photosensitive material in any layered form can be used. Further, it is to be understood that the movement of the film as illustrated in the drawings is only relative. Specifically, the film (or other record medium) could remain stationary and the recording apparatus could move.

Figure 6:
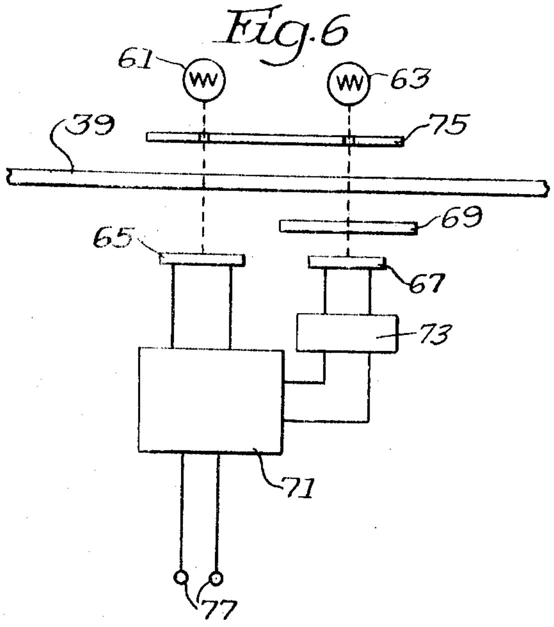
FIG. 6 illustrates one apparatus for reproducing the information recorded in accordance with the systems illustrated in FIGS. 2–5.
Figure 7:
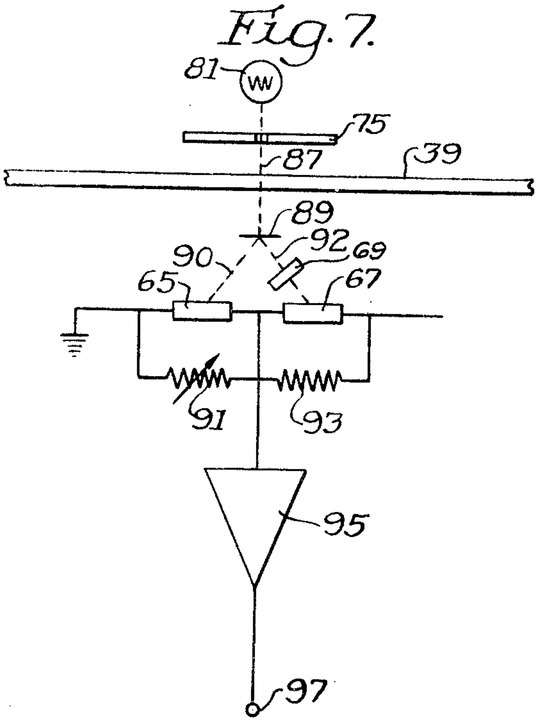
FIG. 7 illustrates a second apparatus for reproducing the information recorded in accordance with the systems illustrated in FIGS. 2–5.

Apparatus for reproducing the sound recorded in accordance with the apparatus illustrated in FIGS. 2–5 is illustrated in FIGS. 6 and 7. The apparatus illustrated in FIG. 6 comprises a first lamp 61, a second lamp 63, a first photodetector 65, a second photodetector 67, a blue pass filter 69, a differential amplifier 71, a time delay circuit 73, and a dual slit plate 75. The film 39 passes between the first lamp 61 and the first photodetector 65 and between the second lamp 63 and the second photodetector 67. The slit plate is located between the lamps and the film 39 with each slit located between a lamp and a photodetector. Hence, the slit plate 75, by means of its slits, directs the light from the lamps along desired lines. Located between the second photodetector 67 and the film 39 is the blue pass filter 69. The output from the first photodetector 65 is connected to one input of the differential amplifier 71. The output from the second photodetector 67 is connected through the time delay 73 to the second input of the differential amplifier 71. The output from the differential amplifier is applied to a pair of output terminals 77.

As the film 39 passes between the lamps 61 and 66 and their related photodetectors 65 and 67 it modulates the light from the lamps. This modulaiton is reproduced as electrical signals at the outputs from the photodetectors. The electrical output from the first photodetector 65 includes both the sound recorded on the inner layers of the multilayer film and the noise created by scratches and other matter on the blue layer of the film. However, the electrical output from the second photodetector 67 only contains the noise created on the blue layer of the film; this is because the blue pass filter 69 passes light in the blue portion of the light spectrum and eliminates light in the green and red portions of the light spectrum. It is to be understood that FIG. 6 only illustrates one location for mounting the blue pass filter 69; it could also be mounted between the second lamp 63 and the slit plate 75 or between the slit plate and the film 39. It is also to be understood that if the second lamp 63 is adapted to only emit light in the blue spectrum that the blue pass filter 69 could be eliminated.

By applying the output signal from the photodetectors to the differential amplifier the difference between them is obtained at its output terminal 77. This difference signal is the desired sound signal without the noise. The time delay 73 is included to provide a time relationship between the signals from the photodetectors. Specifically, the second photodetector 67 is adapted to detect prior to the first detector due to the film moving from right to left. Hence, its output must be delayed to provide synchronism between the signals being detected by both photodetectors. If the film were moving in the opposite direction then the time delay would have to be included in the other circuit. That is, it would have to be included between the first photodetector 65 and the differential amplifier 71.

The foregoing simple apparatus carries out the method of the invention and results in the elimination of noise created on the blue layer by undesired surface aberrations. That is, noise created on the film's blue layer by scratches, dirt, and other matter is eliminated.

The reproducing apparatus illustrated in FIG. 7 is generally similar to that illustrated in FIG. 6; however, only a single lamp 81 is used. Further, the time delay network is eliminated. Mounted between the lamp 81 and the film 39 is a slit plate 75. The slit is utilized to direct the light from the lamp 81 onto the film 39 along a light beam 87. The light beam 87 passes through the slit 83 of the slit plate 75 and the film 39 and impinges on a beam splitter 89. The beam splitter 89 splits the beam into two separate beams 90 and 92. The light beam 90 impinges on the first photodetector 65 and the light beam 92 passes through the blue pass filter 69 and impinges on the second photodetector 67. The blue pass filter 69 is similar to the blue pass filter of FIG. 6 and only passes light in the blue spectrum. The first and second photodetectors 65 and 67 are connected in series between a voltage soure $V_3$ and ground. Connected in parallel with this series combination is a series circuit of a variable resistor 91 and a fixed resistor 93. The junction between the first and second photodetectors 65 and 67 is connected to the junction between the resistors 91 and 93. This interconnection is connected to the input of the amplifier 95. The output from the amplifier 95 is connected to an output terminal 97. The resistances 91 and 93 are merely utilized to adjust the bias across the photodetectors 65 and 67. This adjustment is used so that the noise detected by the second photodetector 67 is proportional to the noise detected by the first photodetector 65.

In operation the circuitry illustrated in FIG. 7 acts as a noise subtractor to eliminate noise. Specifically, the first photodetector 65 is modulated by both noise and sound signals; the second photodetector 67 is only modulated by noise. Because the second photodetector 67 is connected in series with the first photodetector 65 it acts to bias the first photodetector. This bias effect eliminates the effect of noise. More specifically, when noise acts to increase the output of the first photodetector it also acts to increase the output of the second photodetector. This increase in the second photodetector's output maintains a relative bias voltage at the junction between the photodetectors. The maintenance of a constant relative bias voltage at the junction eliminates the effect of the noise increase. Conversely, when noise causes a reduction in the output from the first photodetector it also causes a reduction in the output from the second photodetector. In this situation the relative voltage at the junction is also maintained constant. Hence, the effect of noise is again eliminated.

FIGS. 6 and 7 have depicted the photodetectors as general light energy to electrical energy converting devices. It is to be understood that this includes a wide variety of devices such as photocells, solar cells, photovoltaic cells and photoresistive cells, for example. In general, any light to electrical transducer can be used.

It will be appreciated that the foregoing description has described a simple method and apparatus for eliminating the effect of noise caused by scratches, dirt, or other undesirable aberrations in an optical recording system. The method comprises the steps of recording information on the inner layers of a multilayer film and reproducing the information by scanning the film twice and subtractively combining the resulting signals. One scan is to obtain both noise and signal and the other is to obtain only noise.

A similarly simple apparatus is provided. The recording apparatus of the invention involves means to apply the signal to be recorded to the inner layers of the film and either the simultaneous, before, or later elimination of any sound record in the film's outer layer. The reproducing apparatus of the invention involves means to detect the noise signal and means to detect the noise plus the sound signal. Further means are provided to subtractively combine the two signals to eliminate the noise.

While the foregoing description has described preferred embodiments of the invention numerous modifications can be made without departing from the scope of the invention. For example, FIGS. 3 and 5 illustrate that the blue elimination light is applied to the film after the sound has been recorded; however, this could be reversed. Specifically, the blue elimination light could be applied prior to the sound. Further, the apparatus illustrated in FIG. 6 illustrates the noise detector as detecting after the noise plus sound detector; however, this could also be reversed. Moreover, other film layers can be used by using different filters. Hence, this invention can be practiced otherwise than as specifically described herein.

The embodiments of the invention in which an exclusive property or privilege is claimed are defined as follows:

1. A photographic sound reproducing system comprising:

a photosensitive multi-layer film including an exterior layer sensitive to light rays of one color and an interior layer sensitive to light rays of a second color, said second color being different from said first color, and including an optical sound record formed on said interior layer but not on said exterior layer, said optical sound record having been formed by exposing said interior layer to modulated light rays of said second color;

a lamp mounted on one side of said film, said lamp emitting light rays encompassing said first and second colors;

a slit plate mounted between said lamp and said film for forming the light rays emitted by said lamp into a slit beam directed toward said film so that said slit beam light rays pass through said film, said slit beam light rays being modulated by said optical record formed on said interior and by dirt on and scratches in the exterior layers of said film;

a beam splitter mounted on the other side of said film from said lamp and said slit so as to intersect the modulated slit beam light rays passing through said film and split said slit beam light rays into two light beams having different paths of travel;

a first light detecting element mounted so as to intersect the path of travel of one of said two beams and detect the slit beam light rays passing along that path;

a second light detecting element mounted so as to intersect the path of travel of the other of said two beams and detect the slit beam light rays passing along that path;

a color filter mounted between said beam splitter and said second light detecting element so as to prevent the passage of the slit beam light rays modulated by said interior layer while allowing the passage of the slit beam light rays modulated by dirt on and scratches in said exterior layers of said film;

electric circuit means for subtractively connecting said first and second light detecting elements together so that an electric signal which represents only the sound recorded on said interior layer of said multilayer film is produced; and, an amplifier connected to said electric circuit means for amplifying said electric signal.

2. A photographic sound reproducing system comprising:

a photosensitive multi-layer film including an exterior layer sensitive to light rays of one color and an interior layer sensitive to light rays of a second color, said second color being different from said first color, and including an optical sound record formed on said interior layer but not on said exterior layer, said optical sound record having been formed by exposing said interior layer to modulated light rays of said second color;

a first lamp mounted on one side of said film, said first lamp emitting light rays encompassing at least said first color;

a second lamp mounted on the same side of said film as the first lamp, said second lamp emitting light rays encompassing at least said second color;

a slit plate mounted between said first and second lamps and said film for forming the light rays emitted by said lamps into two slit beams directed toward the same track on said film so that said slit beam light rays pass through said film along difference paths of travel, said slit beam light rays being modulated by said optical record formed on said interior and by dirt on and scratches in the exterior layers of said film;

a first light detecting element mounted on the other side of said film so as to intersect the path of travel of one of said two beams and detect the slit beam light rays passing along that path;

a second light detecting element mounted on the other side of said film so as to intersect the path of travel of the other of said two beams and detect the slit beam light rays passing along that path;

a color filter mounted between said film and said second light detecting element so as to prevent the passage of the slit beam light rays modulated by said interior layer while allowing the passage of the slit beam light rays modulated by dirt on and scratches in said exterior layers of said film;

a time delay circuit connected to said second light detecting element; and a differential amplifier having one input connected to said time delay circuit and a second input connected to said first light detecting element so as to subtractively combine the signals from said time delay element and said first light detecting manner in timed relationship whereby an electric signal which represents only the sound recorded on said interior layer of said multilayer film is produced.

3. A photographic sound recording system comprising:

a photosensitive multi-layer film including an exterior layer sensitive to light rays of one color and an interior layer sensitive to light rays of a second color, said second color being different from said first color;

a microphone mounted so as to detect sounds to be recorded;

an amplifier connected to the output of said microphone to amplify the sounds detected by said microphone;

a first lamp mounted on one side of said film and connected to the output of said amplifier so that the intensity of the light rays emitted by said first lamp are modulated in accordance with the output of said amplifier, said first lamp emitting light rays encompassing at least said second color;

a second lamp mounted on the same side of said film as the first lamp, said second lamp emitting high intensity light rays of said first color and essentially zero light rays of said second color; and, a slit plate mounted between said first and second lamps and said film for forming the light rays emitted by said lamps into two slit beams directed toward the same track on said film so that said slit beam light rays pass through said film, said slit beam light rays emitted by said first lamp modulating said interior layer of said film so as to form an optical sound record of the sound detected by said microphone and said slit beam light rays emitted by said second lamp exposing said exterior layer so as to remove any optical record formed therein by said first lamp's slit beam light rays whereby a variable density sound record is formed in said interior layer but not in said exterior layer.

4. A photographic sound recording system comprising:

a photosensitive multi-layer film including an exterior layer sensitive to light rays of one color and an interior layer sensitive to light rays of a second color, said second color being different from said first color;

a microphone mounted so as to detect sounds to be recorded;

an amplifier connected to the output of said microphone to amplify the sounds detected by said microphone;

a first lamp mounted on one side of said film, said first lamp emitting light rays encompassing at least said second color;

a second lamp mounted on the same side of the film as the first lamp, said second lamp emitting high intensity light rays of said first color and essentially zero light rays of said second color;

a first slit plate mounted between said first lamp and said film for forming the light rays emitted by said first lamp into a first slit beam directed toward said film;

a solenoid including a coil connected to the output of said amplifier, said solenoid also including a shaft;

a movable plate connected to the shaft of said solenoid and mounted on one side of the slit in said first slit plate so as to partially obscure the slit and prevent light rays from said first lamp passing to said film, said plate adapted to move back and forth with respect to the longitudinal axis of said slit in said first slit plate in accordance with the amount of energy applied to said solenoid coil by said amplifier whereby a variable width optical sound record is formed on said interior layer of said multilayer film; and, a second slit plate mounted between said second lamp and said film for forming the light rays emitted by said second lamp into a second slit beam directed toward said film along the same track as said first slit beam so as to remove any optical record formed in said exterior layer by said first lamp's slit beam light rays whereby a variable width sound record is formed in said interior layer but not in said exterior layer.

References Cited

UNITED STATES PATENTS

| | | | |
|---|---|---|---|
| 2,136,143 | 11/1938 | Michaelis | 179—100.3 X |
| 2,527,463 | 10/1950 | Sziklai | 179—100.3 |
| 3,281,151 | 10/1966 | Kaprelian et al. | 179—100.3 X |
| 3,407,272 | 10/1968 | Barocela | 179—100.3 |

BERNARD KONICK, Primary Examiner

R. F. CARDILLO, Jr., Assistant Examiner